July 20, 1943.  K. F. HOFFMANN ET AL  2,324,702
SURGICAL SIMULACRA AND PROCESS OF PREPARING SAME
Filed Nov. 30, 1938
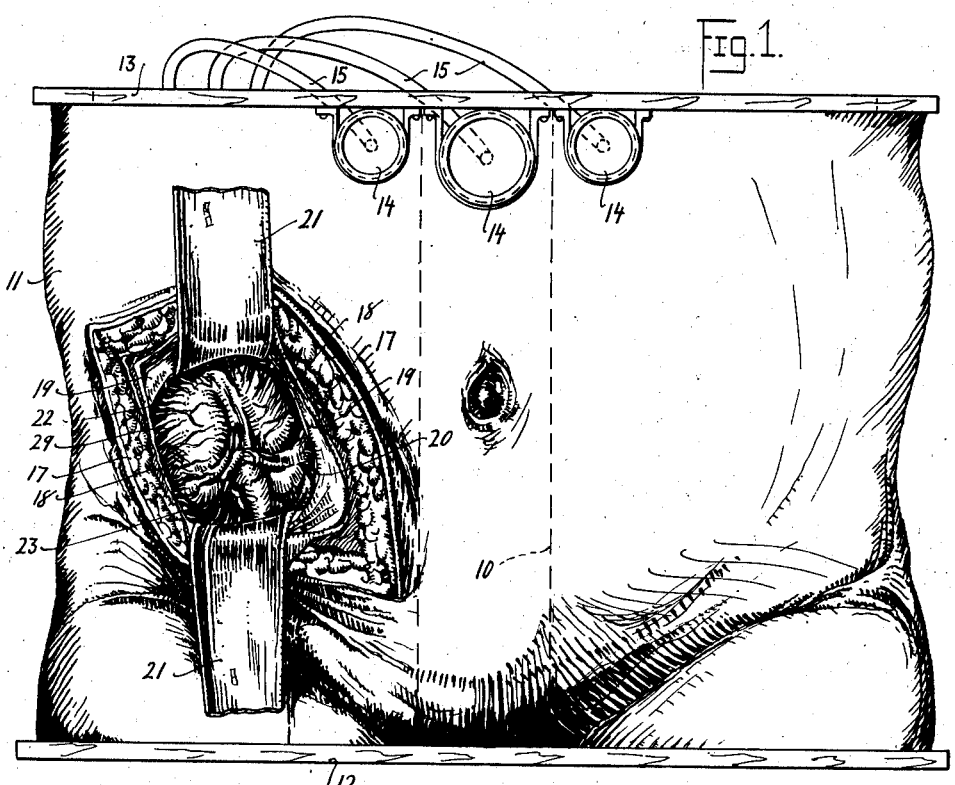
Edgar Fliegenschmidt
Karl F. Hoffmann
INVENTORS
BY
ATTORNEY

Patented July 20, 1943

2,324,702

UNITED STATES PATENT OFFICE 2,324,702

SURGICAL SIMULACRA AND PROCESS OF PREPARING SAME

Karl F. Hoffmann, New York, N. Y., and Edgar Fliegenschmidt, North Bergen, N. J.

Application November 30, 1938, Serial No. 243,132

11 Claims. (Cl. 35—17)

This invention concerns surgical simulacra, and the method in which they are made. By the term surgical simulacra we define an article of manufacture, which is an anatomical replica, responding to touch and surgery substantially in the manner of a human body or part thereof.

Unless they are original anatomical preparations, medical exhibits are particularly directed to the sense of sight, being ordinarily prepared as hard casts, or in stiff materials like parchment, with the prime object of preserving and teaching to the eye the shape in which they were cast or formed. By way of contrast, an object of this invention is directed primarily to the sense of touch, although this preferably also offers, like a medical exhibit, shape and appearance in simulation of an anatomical body. But beyond that it is an object of this invention to offer an article for direct touch as well as for the indirect touch and application of instruments, implements, sutures, etc. Thus we provide, in connection with a simulacrum, for the reactions formerly only experienced with anatomical bodies, for instance in respect to hardness and resilience, tensile and compressive strength, reactions produced by body fluids, etc. For the earnest medical student who does not want to approach a surgical problem without experience, and also for the medical practitioner, who uses the scalpel only on rare occasions, or who is not thoroughly familiar with the part of the body to be operated upon, it is an ethical and indispensable necessity to rehearse an operation before it is performed upon a living being, unless it be harmful or fatal. The schooled surgeon might prepare himself by mental rehearsal. But due skill must ordinarily be accustomed and becomes so only after experience of touch and manipulation.

Cadavers are rarely available for practice when needed. Often a cadaver behaves different from a live body. Nor does it show the reactions of body fluids, such as blood, which demands primary consideration during an operation.

Other objects of this invention concern the lasting property of surgical simulacra, so that it is available whenever needed. In order to prevent prohibitive costs of an article of this invention, and to provide economy of use, the invention provides for restoration rather than replacement, when necessary.

While an attainment of the objects of this invention might have presented a prohibitive task only a few decades ago, rapid progress of the chemistry and mechanics of materials has reduced the problem of this invention to the question of selection, adaptation and treatment as far as materials are concerned. The invention provides for the preparation of elements of tissue, organs, bones, etc., and their assembly into an artificial anatomical body or parts thereof, the elements being assembled and interconnected in physical simulation of the organism to be reproduced. While it is possible to prepare some elements, like bones, by single casts, this invention has to provide for ways of simulating and assembling many other elements of the body, which, in spite of the many materials available, cannot be readily cast nor otherwise prepared wholesale, such as skins or membranes, ducts, organs, etc. Frequently the parts have to be molded in sub-divisions, or they may be molded according to this invention from one side only, the other side being formed otherwise.

Here, as in many other respects, the invention provides primarily for simulation of anatomical functions and reactions rather than of anatomical shapes. Reaction to touch and handling is here at least as important as appearance.

While the choice of materials for articles of this invention must necessarily be guided by the objects stated above, economical and practical considerations of the preparation of the article are of prime import, especially because they appear to offer unsurmountable obstacles. Here the invention provides for improved molding, for a progressive assembly, not only of the parts to each other, but of the divisional elements, and novel adaptation of materials. It further provides for simulation of texture and color, and also for adaptation of the materials for pigmentation.

These and other objects of this invention may be better understood by way of an example, and by a description of a specific embodiment, which must, however, be considered to be illustrative rather than limitative of this invention.

In the drawing:

Fig. 1 exemplarily shows a simulacrum in use, representing a plan view of the abdominal portion of a torso.

Fig. 2 shows a corresponding end view.

Fig. 3 shows a partly open mold, by which an imprint has been taken of an organ of the body, e. g. the appendix.

Similar numerals refer to similar parts throughout the various views.

A simulacrum of this invention may be assembled upon a skeleton, or upon a suitable replica of a skeleton, or part thereof. Or the supporting structure, upon which the simulacrum is mounted, may offer a support corresponding to that given by bones, as it would, for instance, be the case in connection with a torso 11 shown in Fig. 1. The torso is endwisely retained between a rear board 13 and a front board 12, where a desired yield may be obtained by using flexible material or even fully elastic and yieldable material, like rubber. These two boards are again assembled with each other by way of a bottom column 10, which substantially offers the reaction of a spine. The simulated tubes and portions of the torso, such as the blood vessel and intestinal tracts, may be connected by tubes or pipes 15 to one or more containers 14, the supply of fluids being controlled by valves 16. The containers 16 are mounted at a suitable location, e. g. upon the rear board 13, so as to furnish heads for the fluids supplied thereby corresponding to pressure conditions in the ducts or vessels of a human body.

In a lateral gridiron incision, the student has first to cut the skin 17, has divided the aponeurosis 18 of the external oblique muscle along the course of its fibres, has separated the latter from the internal oblique, has separated the latter by sharp dissection from the muscle substance of the internal oblique 19, has split the latter and the transversalis muscle and fascia 20 in the direction of their fibres, and, after removal of the preperitoneal fat, the wound being held open by retractors 21, the cecum 22 and the appendix 23 are exposed. Let us start the description of the construction of such a simulacrum with the intestines, which thus have been exposed. Generally speaking, a surgical simulacrum is made as follows:

1st: Negative molds or imprints are made of the parts of a cadaver.

2nd: The parts are reproduced, from the imprints, e. g. by way of more permanent molds, or layers of the parts are shaped in suitable material.

3rd: The reproduced parts assembled.

The (negative) mold may preferably be made by first casting the parts of the cadaver in a temporary (negative) mold, preparing a temporary (positive) cast of such part in such temporary mold, and then preparing a permanent (negative) mold from such temporary (positive) cast. By way of example, the procedure may be as follows in connection with an intestinal tract. The tract is suitably filled to assume a normal position, e. g. for the instant it may be inflated. The surface is suitably coated in order to prevent sticking of the mold; if the temporary mold is to be cast according to this invention in latex, the outer surface of the tract is covered with a coagulant, e. g. a calcium chloride acetic acid solution. A latex layer was found to set in 3 minutes in a solution containing by weight 1 part of acetic acid, 15 parts of calcium chloride, 35 parts of water.

Latex is then applied, e. g. by dipping; or preferably it is sprayed on by an ordinary spray gun. In order to prevent clogging of the gun, the latex should be fresh. A high latex concentration (60%) is desirable and ammonia solution representing about one-eighth part of the total volume may be added for spraying. After the application of several layers of latex, coagulant being alternately applied, a number of rubber tubes 24 may be deposited substantially parallel to each other upon the latex layers, across the contemplated parting plane of the temporary mold 25, as indicated in connection with Fig. 3. The rubber tubes 24 may be retained in an extended, straight position by smooth sticks 26 removably inserted therethrough. Additional layers of latex are now applied and coagulated, embedding the central portions of the rubber tubes 24, the ends of said tubes remaining free. The temporary mold 25 is now completed. It may be removed from the cadaver by pulling the sticks 26 out of the rubber tubes 24, and by parting the molds by a clean cut across the wall containing the rubber tubes 24, whereupon the temporary mold 25 may be removed from the organ upon which it has been formed, i. e. the appendix, and has the appearance of Fig. 3.

After the parting planes 28 have been returned into abutment with each other and the sticks 26 have been reinserted and extend fully through the rubber tubes 24, the cavity 27 of the temporary mold 25 has resumed its true shape. From this reassembled temporary mold, the positive cast is made, e. g. in paraffin preferably cast in the moist or remoistened latex mold, which therefore is not shrunk.

From the temporary (positive) cast of the appendix a permanent mold may be obtained, i. e. cast in gypsum, or in stone which takes longer for the setting than the gypsum. If the gypsum mold has a substantial central parting, the parts of the halves of the two-partite mold may be extended alongside of each other. We may suitably coat the cavity, e. g. with glycerine, in order to prevent a sticking of the final cast or molding, which is to be molded separately in each half of the mold.

While latex has not been used heretofore for taking molds from organic tissues and anatomic organs, the results are excellent when the foregoing procedure is followed, as modified for certain purposes hereinafter. Latex yields fine and true details, is well adapted for undercuts, may readily be detached from the tissues; does not press the specimen out of shape, can be caused to set quickly, and yields casts of true size when kept in a moist state. This unexpected new use of latex does however not fully extend, i. e. not in respect to several parts, to the final or permanent cast of the simulacra. However for this latter purpose, another material has been converted, which heretofore has not been found adaptable for positive casts. This is a synthetic, rubber-like material, which by itself or in solution is commonly known as molding or matrix jells, and which is adapted for repeated fusion under heat. Such a material may be identified for the instant purposes as an elastic, soft and yieldable but form-retaining, thermo-fusible plastic. Consistency of the various modifications offered in the market (e. g. Korogel) may approach or may be controlled to approach the physical properties and consistency of all kinds of organic tissue, skin etc., while bone, cartilage etc. may be readily simulated in other fashion. According to this invention it may be prepared in thicknesses corresponding to the skins also in tensile and compressive strength, hardness, resiliency, etc.

While the molding jells are extremely susceptible to foreign matter, losing for instance their softness and elasticity and other properties when contaminated, we have found it well possible to tint these jells for purposes of simulation of the various organic tissues, when a suitable protective carrier is used as a base for the pigments; such a carrier is zinc oxide. It is most important for the instant purposes, that such material can be shaped and reshaped and pieced under heat, and that various layers of such material may be caused to adhere more or less closely to each other, in simulation of the various tissues of the human body. Such a material reacts under the scalpel in a manner corresponding to the tissues of the human body, and the sections may be reassembled by suture, in simulation of surgical practice.

When such a molding jell is used in the manner of sealing wax, using for instance a small torch for melting the material so that it drips into place, it may be controlled to cover the cavities of the aforementioned parts of a permanent mold of the appendix, in a thickness corresponding to that of the skin of an organ, e. g. the appendix. After the two halves have been shaped in the parts of the two-partite mold, they may be fused together along their edges, thus yielding a complete simulation of the appendix.

The laborious procedure just suggested may be simplified particularly in connection with larger specimens like the entire intestinal tract, as follows: The bowel tract of the cadaver is slit open lengthwise, and is developed. From this developed tract a latex imprint is taken, and reduced to a final or permanent mold, as described above. A sheet of the desired thickness of the molding jell is poured out onto a smooth plate, and a section thereof corresponding to the size of the cavity of the mold is deposited therein and shaped under heat into a shell corresponding to the developed tract. Opposite edges of the shell or cast may be fused together, after it has been removed from the mold, so that the tract is simulated. A second shell prepared in the same manner, may then be closed over the first shell, opposite edges being again fused together, so that there is now a simulation of two skins within each other, corresponding to actual arrangement of the intestines. Any plurality of layers may be reproduced, may be assembled over each other, either loosely or tacked together by fusion in simulation of the anatomy. Suitable fillings may be applied which simulate the hardness, consistency, viscosity, porosity, etc. of actual conditions.

Heat and suitable admixtures may be applied to the jells in order to control the consistency and characteristics of the various parts simulated. Where both sides of an anatomic part are to be shown, for instance in connection with a long flat muscle, the final cast is made of a two-partite mold, and the two halves cast therein are fused together back to back.

After the parts of the simulacrum have been assembled, from the inside out, for instance in connection with the abdominal portion of a torso of Fig. 1, the skin, molded according to the detail desired, as a whole or in layers fused together, following the procedure outlined above for the bowel tract, may be extended thereover, being suitably attached to the boards 2 and 3 and the column 10. Of course opposite edges of the skin may be fused together in the back, so that the skin closes over the column 10.

Blood vessels may be shaped as such, or may be shaped in surrounding tissue. It is for instance convenient to have a distribution of blood vessels 29 in a diaphragm by providing corresponding voids between two layers of a molding jell, which are otherwise loose, smooth ends interposed between, when they are being fused together, said ends being afterwards extracted endwise. Such simulacral vessels can be supplied with a suitable liquid content from one of the containers 14.

Then the student operating on the simulacrum will have to ligate these ducts or vessels in simulation of an actual operation.

When a simulacrum has been disfigured by extended use, and is, for instance, covered with sutures, the sutures may be removed, and corresponding sections may be reassembled by fusion.

Many of the jells adaptable for use in a simulacrum of this invention are transparent. In spite of tinting for identification, these jells may substantially remain transparent in an article of this invention, when it is desirable.

Having thus described our invention in detail we do not wish to be limited thereby, except as the state of the art and the appended claims may require, for it is obvious that various modifications and changes may be made in the form of embodiment of our invention, without departing from the spirit and scope thereof.

What we claim is:

1. The method of producing a surgical simulacrum, comprising taking imprints from anatomical elements which are anatomically associated with each other, reproducing said elements from said imprints in synthetic molding jells having lasting qualities but having also physical properties similar in respect to reaction to touch, incision, and suture or ligation to those of said elements, respectively and permanently assembling said reproductions with each other in conformity with the anatomy of said elements.

2. The method of producing a surgical simulacrum, comprising taking imprints from anatomical elements which are anatomically associated with each other, tinting synthetic molding jells having physical properties similar in respect to reaction to touch, incision, and suture or ligation to those of said elements by pigments mixed with a protective carrier prohibiting a change of the composition of said jells, reproducing each of said elements from said imprints in a differently colored jell of corresponding physical properties, and assembling said reproductions in conformity with the anatomy of said elements.

3. The method of producing a surgical simulacrum, comprising taking imprints from associated anatomical elements, tinting synthetic molding jells having physical properties similar in respect to touch, incision and suture to those of said elements by pigments mixed with zinc oxide as a protective carrier, reproducing each of said elements from said imprints in a differently colored jell of corresponding physical properties, and assembling said reproductions in conformity with the anatomy of said elements.

4. The method of producing a surgical simulacrum, comprising preparing a pair of similar layers of a molding jell corresponding in shape to a membrane, ramifying smooth wire between said layers in simulation of vessels for body liquids, fusing said layers together, and withdrawing said wires, so that there remain voids simulating said vessels.

5. The method of preparing an imprint from an anatomical specimen, comprising successively spraying successive layers of latex onto said specimen, and applying a coagulant to said specimen before the first one of said layers is sprayed thereunto.

6. The method of preparing an imprint from a hollow anatomical specimen, comprising inflating said specimen, successively spraying successive layers of latex onto said specimen, and applying a coagulant to said specimen before the first one of said layers is sprayed thereunto and to layer before a successive step of spraying.

7. The method of preparing an imprint from an anatomical specimen, comprising successively spraying successive layers of latex onto said specimen, and applying an acetic acid solution of calcium chloride to said specimen and to a successively applied layer just before a layer of latex is sprayed on.

8. The method of preparing a mold from an anatomical specimen, comprising coagulating successively applied latex layers on said specimen, spacedly depositing rubber tubes on said layers through which smooth straightening sticks are removably extended, engaging said tubes upon said layers by additionally applied and coagulated latex layers, withdrawing the sticks from the tubes, parting the wall of the latex mold thus produced by cutting it across the buried portions of the tubes, removing the specimen, and reinserting the sticks for realigning the mold in its true outline.

9. A surgical simulacrum comprising a reproduction of an anatomical duct in a synthetic jell having physical properties of reaction to touch, incision and suture similar to those of the duct reproduced in a live body, and a liquid container connected to said reproduction and serving to place said reproduction under a liquid head corresponding to pressures normally prevailing in the reproduced duct in the live body.

10. A surgical simulacrum comprising elements made of a synthetic, rubber-like plastic adapted to be lastingly shaped under heat and shaped in the organization of the anatomical organs, said plastic being conditioned to correspond in the case of each organ simulated therein to the live organ in respect to reaction to touch, incision and suture, said elements being tinted, fusedly interconnected and assembled in simulation of anatomical structure of the simulated organs.

11. In a surgical simulacrum a layer and a vessel arranged corresponding to a tissue and a duct of a live body, said layer and vessel being made of synthetic materials having lasting qualities but responding to suture and ligation like such tissue and duct, respectively, and being tacked together to yield a relative organization corresponding to the arrangement of said tissue and cut in a live body.

KARL F. HOFFMANN.
EDGAR FLIEGENSCHMIDT.